United States Patent
Matsushige

(10) Patent No.: US 8,250,453 B2
(45) Date of Patent: Aug. 21, 2012

(54) STORAGE APPARATUS AND DATA VERIFICATION METHOD IN STORAGE APPARATUS

(75) Inventor: Hiromi Matsushige, Hiratsuka (JP)

(73) Assignee: Hitachi Ltd., Tokyo (JP)

( * ) Notice: Subject to any disclaimer, the term of this patent is extended or adjusted under 35 U.S.C. 154(b) by 856 days.

(21) Appl. No.: 12/309,138

(22) PCT Filed: Dec. 22, 2008

(86) PCT No.: PCT/JP2008/003891
§ 371 (c)(1),
(2), (4) Date: Jan. 8, 2009

(87) PCT Pub. No.: WO2010/073291
PCT Pub. Date: Jul. 1, 2010

(65) Prior Publication Data
US 2011/0185268 A1  Jul. 28, 2011

(51) Int. Cl.
G06F 7/02 (2006.01)
(52) U.S. Cl. .......... 714/819; 714/763; 714/770
(58) Field of Classification Search ........ 714/52, 714/763, 767, 769, 770, 819
See application file for complete search history.

(56) References Cited

U.S. PATENT DOCUMENTS

| | | | |
|---|---|---|---|
| 6,009,498 A * | 12/1999 | Kumasawa et al. .......... 711/113 |
| 7,076,604 B1 | 7/2006 | Thelin |
| 7,398,448 B2 * | 7/2008 | Nakagawa et al. .......... 714/763 |
| 7,516,246 B2 * | 4/2009 | Condorelli et al. .......... 710/15 |
| 7,712,004 B1 * | 5/2010 | Campbell et al. .......... 714/746 |
| 7,907,362 B2 * | 3/2011 | Isono et al. .......... 360/51 |
| 2006/0047872 A1 * | 3/2006 | Nakagawa et al. .......... 710/100 |
| 2006/0095813 A1 | 5/2006 | Yagisawa et al. |
| 2006/0218471 A1 * | 9/2006 | Arashi .......... 714/770 |
| 2007/0250757 A1 * | 10/2007 | Takahashi .......... 714/763 |
| 2009/0055584 A1 * | 2/2009 | Hafner et al. .......... 711/114 |
| 2011/0185268 A1 * | 7/2011 | Matsushige .......... 714/819 |

FOREIGN PATENT DOCUMENTS

JP  2006-72435  8/2004
JP  2007-265157  3/2006

OTHER PUBLICATIONS

International Search Report, dated Jun. 15, 2009.

* cited by examiner

Primary Examiner — Yolanda L Wilson
(74) Attorney, Agent, or Firm — Stites & Harbison, PLLC; Juan Carlos A. Marquez, Esq

(57) ABSTRACT

When a data write request to a disk drive 210 is received from a host computer 20, a first error detecting code of write data to be written to the disk drive 210 in response to the data write request is generated and stored, write processing of the write data to the disk drive 210 is executed, whether or not response time as time required for the write processing exceeds a predetermined threshold value is determined, data stored in a sector as a writing destination of the write data is read from the sector when the response time exceeds the threshold value, a second error detecting code of the read data is generated, and when the first error detecting code and the second error detecting code are compared with each other and the two codes do not coincide with each other, a signal indicating that the write processing is not normally performed is generated.

16 Claims, 13 Drawing Sheets

DATA FRAME STRUCTURE (SAS)

SECTOR STATUS MANAGEMENT TABLE 900

| LBA | FLAG |
|-----|------|
| A | 0 |
| B | 0 |
| C | 0 |
| D | 1 |
| E | 0 |
| ⋮ | ⋮ | ly to a technique for improving reliability of data in
STORAGE APPARATUS AND DATA VERIFICATION METHOD IN STORAGE APPARATUS

TECHNICAL FIELD

The present invention relates to a storage apparatus and a data verification method in the storage apparatus, and more particularly to a technique for improving reliability of data in the storage apparatus without increasing overhead.

BACKGROUND ART

In accordance with capacity increase and price reduction of disk drives (hard disk drives), there have been used disk drives with low cost and large capacity such as SATA (Serial ATA) or the like in storage apparatuses such as a disk array apparatus and the like, as well. However, as compared with the conventional SAS (Serial Attached SCSI) drives, these drives with low cost and large capacity do not have sufficient reliability in many cases, and measures to improve reliability of these drives need to be taken in the case of using these drives for the storage apparatus where high reliability is required.

As a mechanism to achieve such purpose Patent Citation 1, for example, describes a technique (hereinafter referred to as a RAW (Read After Write) system) in which: a first check code based on write data is stored in a cache memory; writing of the write data with the first check code added is executed with a predetermined storage area specified; then, data stored in the storage area is read to generate a second check code; and it is determined that write data is normally stored in the storage when a correspondence between the first and second check codes is correct.

However, in the above RAW system, data is read from the disk drive whenever data writing is executed, and overhead is increased correspondingly. In the conventional write data guarantee system, detection of incorrect data on the disk drive is performed in units of blocks. Therefore, when a write command itself is lost for some reason and writing of the write command to a write target block is not performed, this incident cannot be detected.

Further, in the case where the SATA drive is attached to and used in the storage apparatus supporting the SAS drive (mixed SAS/SATA storage system), there is a need to place a sector-size conversion circuit between a control circuit, which performs writing to a disk drive, and the disk drive. However, when data is written to an unexpected address of the disk drive due to an erroneous operation of the conversion circuit, this incident cannot be detected by the conventional guarantee system.

DISCLOSURE OF INVENTION

The present invention has been made in view of the afore-mentioned circumstances, and it is an object of the present invention to provide a storage apparatus capable of improving reliability of data in a storage apparatus without increasing overhead, and a data verification method in the storage apparatus.

In order to solve the above and other problems, a storage apparatus according to one aspect of the present invention is a storage apparatus, having a CPU and a memory, and performing writing or reading data to and from a storage device in response to a data input/output request transmitted from an external apparatus, the storage apparatus including: a first error detecting code generating part that generates and stores, when receiving a data write request to the storage device as the data input/output request, a first error detecting code of write data to be written to the storage device by the data write request; a write processing executing part that executes write processing of the write data to the storage device; a timeout determining part that determines whether or not a response time as time required for the write processing exceeds a predetermined threshold value; a verification data reading part that reads data from a unit storage area of the storage device as a writing destination of the write data when the response time exceeds the threshold value, the data stored in the storage area; a second error detecting code generating part that generates a second error detecting code of read data; and a comparison and verification processing part that generates a signal indicating that the write processing was not normally performed, when the first error detecting code and the second error detecting code do not coincide with each other as a result of comparison of the two codes, wherein the first error detecting code generating part, the write processing executing part, the timeout determining part, the verification data reading part, the second error detecting code generating part, and the comparison and verification processing part are implemented when the CPU reads and executes a program stored in the memory.

The storage apparatus of the present invention performs generation of the second error detecting code and comparison between the first error detecting code and the second error detecting code only when the response time required for write processing exceeds the threshold value. Accordingly, as long as the response time required for write processing does not exceed the threshold value (usually, it does not exceed the threshold value), overhead for write processing is little affected by processing for verifying write data. Note that generation of the first error detecting code is performed even when the response time does not exceed the threshold value, but a load generated by the generation processing for the first error detecting code is generally small and overhead for write processing is little affected by this processing.

Moreover, when the response time required for write processing exceeds the threshold value, generation of the second error detecting code and comparison between the first error detecting code and the second error detecting code are performed so that reliability of data writing can be improved. Note that the case in which the response time required for write processing exceeds the threshold value is a case in which data cannot be written correctly in the storage device for some reason and writing is retried many times, for example. Namely, in the present invention, when there is a high possibility that data is not correctly written as mentioned above, data verification is performed without fail.

The storage apparatus according to one aspect of the present invention is the afore-mentioned storage apparatus further including a write destination status managing part that stores a write destination status management table that manages whether or not effective data is currently written in each unit storage area of the storage device; determines whether or not effective data is currently written in the unit storage area as the writing destination of the write data with reference to the write destination status management table prior to execution of the write processing; and generates a signal indicating that the write processing was not normally performed, when the effective data is currently written in the unit storage area.

Thus, according to the present invention, it is determined whether or not effective data is currently written in the unit storage area (sector) as the writing destination with reference to a unit storage area status management table (sector status management table) prior to execution of data write processing. When effective data is currently written in the unit storage area, a signal which indicates that the write processing was not performed normally is generated (determining an error).

According to the present invention, when wrong data is present in the unit storage area, it is possible to detect this fact. Therefore, for example, when data is written to an unexpected address of the disk drive due to an erroneous operation of the afore-mentioned sector-size conversion circuit, it is possible to detect that data written to the address is invalid data.

The storage apparatus according to one aspect of the present invention is the afore-mentioned storage apparatus in which the comparison and verification processing part updates contents of the unit storage area status management table to contents which indicates that effective data is currently written in the unit storage area of the storage device as the writing destination of the write data, when the first error detecting code and the second error detecting code coincide with each other as a result of a comparison of the two codes.

When the first error detecting code and the second error detecting code coincide with each other, in an above manner, namely when the verification is successful, the fact that effective data is currently written in the unit storage area is registered in the unit storage area status management table and effective data can be surely managed as effective data.

The storage apparatus according to one aspect of the present invention is the afore-mentioned storage apparatus further including a unit storage area status managing part that stores a unit storage area status management table that manages whether or not effective data is currently written in each unit storage area of the storage device; determines whether or not effective data is currently written in the unit storage area as a target of initialization processing with reference to the unit storage area status management table prior to execution of initialization processing of the unit storage area of the storage device; and generates a signal indicating that the initialization processing is not normally performed, when effective data is currently written in the unit storage area.

Thus, according to the present invention, even when the unit storage area is initialized, it is determined whether or not effective data is currently written in the unit storage area. As a result, as in the case of writing, when illegal data is present in the unit storage area, it is possible to detect this fact.

The storage apparatus according to one aspect of the present invention is the afore-mentioned storage apparatus including an initialization processing executing part that executes initialization processing of the unit storage area when effective data is not currently written in the unit storage area as a result of the determination, wherein the unit storage area status managing part updates contents of the unit storage area status management table to contents indicating that effective data is not currently written in the unit storage area of the storage device as a target of the initialization processing.

In this way, according to the present invention, when initialization processing is successful, the fact in which effective data is not currently written in the initialized unit storage area is registered in the unit storage area status management table. Accordingly, a writable unit storage area can be surely managed as a writable unit storage area.

The storage apparatus according to one aspect of the present invention is the afore-mentioned storage apparatus further including a unit storage area status managing part that stores a unit storage area status management table that manages whether or not effective data is currently written in each unit storage area of the storage device; determines whether or not effective data is currently written in the unit storage area as a storage destination of the read data with reference to the unit storage area status management table prior to executing data read processing from the unit storage area of the storage device; and generates a signal which indicates that the read processing was not normally performed, when effective data is not currently written in the unit storage area.

Thus, according to the present invention, it is determined whether or not effective data is currently written in the unit storage area as a read data storage destination with reference to the unit storage area status management table prior to execution of data read processing from the unit storage area. When effective data is not currently written in the unit storage area, a signal which indicates that the read processing was not normally performed is generated (determining an error).

According to the present invention, when effective data to be originally present does not exist in the unit storage area, it is possible to detect this fact. Therefore, for example, when the aforementioned sector-size conversion circuit operates erroneously and data is written to an unexpected address of the disk drive, when the result that no data is written in the unit storage area where data is originally to be written, it is possible to detect this fact. In addition, for example, when a write command itself is lost for some reason and writing of the write command to a write target block is not performed, it is possible to detect this fact.

The storage apparatus according to one aspect of the present invention is the afore-mentioned storage apparatus further including: a control device including a channel controlling device, a disk controlling device, and a cache memory that are coupled to one another; and the storage device including a disk drive, wherein the channel con-trolling device transmits an input/output command to the disk controlling device when receiving the data input/output request from the external apparatus, the disk controlling device writes or reads data to or from the disk drive when receiving the input/output command, the channel controlling device and the disk controlling device gain access to the cache memory to transmit and receive write data to the disk drive or read data from the disk drive, any one of the control device and the storage device includes a CPU, a memory, and a conversion board which is disposed between the disk controlling device and the disk drive and which performs conversion between a data frame structure transmitted and received to and from the disk controlling device, and a data frame structure transmitted and received to and from the disk drive, and the first error detecting code generating part, the write processing executing part, the timeout determining part, the verification data reading part, the second error detecting code generating part, and the unit storage area status managing part are implemented when the CPU of the conversion board executes a program stored in the memory.

The first error detecting code generating part, the write processing executing part, the timeout determining part, the verification data reading part, the second error detecting code generating part, and the unit storage area status managing part are provided in the conversion board that performs conversion of the data frame structure in an above manner, thereby making it possible to selectively provide the aforementioned configuration for ensuring reliability of only a specific disk drive (for example, SATA drive) necessary for ensuring reliability. Therefore, it is possible to prevent introduction of unnecessary devices and increase in cost due to the introduction.

The storage apparatus according to one aspect of the present invention is the afore-mentioned storage apparatus in which the conversion board stores the unit storage area status management table, and in the conversion board, a backup processing part that writes contents of the unit storage area status management table to the disk drive is implemented by the CPU of the conversion board executing a program stored in the memory when a power supply voltage of the conversion board is a predetermined threshold value or lower.

When a failure of some kind occurs in the conversion board, resulting in a loss of the unit storage area status management table stored in the conversion board, there arise obstacles to the operation of the storage apparatus. However, according to the present invention, when the power supply voltage of the conversion board is reduced to the predetermined threshold value or lower, the content of the unit storage area status management table is written to the disk drive, and therefore it is possible to prevent the unit storage area status management table from getting lost. Moreover, the content of the unit storage area status management table written in the disk drive is stored in the conversion board after the failure is recovered, thereby making is possible to easily and smoothly resume the operation of the disk drive.

Problems and solutions thereto disclosed in this application other than the above will become clear from the section of the embodiment of the invention with reference to the accompanying drawings.

According to the present invention, it is possible to improve reliability of data in the storage apparatus without increasing overhead.

DESCRIPTION OF EMBODIMENTS

In the following, description on embodiments of the present invention with reference to the accompanying drawings will be given in detail.

Figure 1:
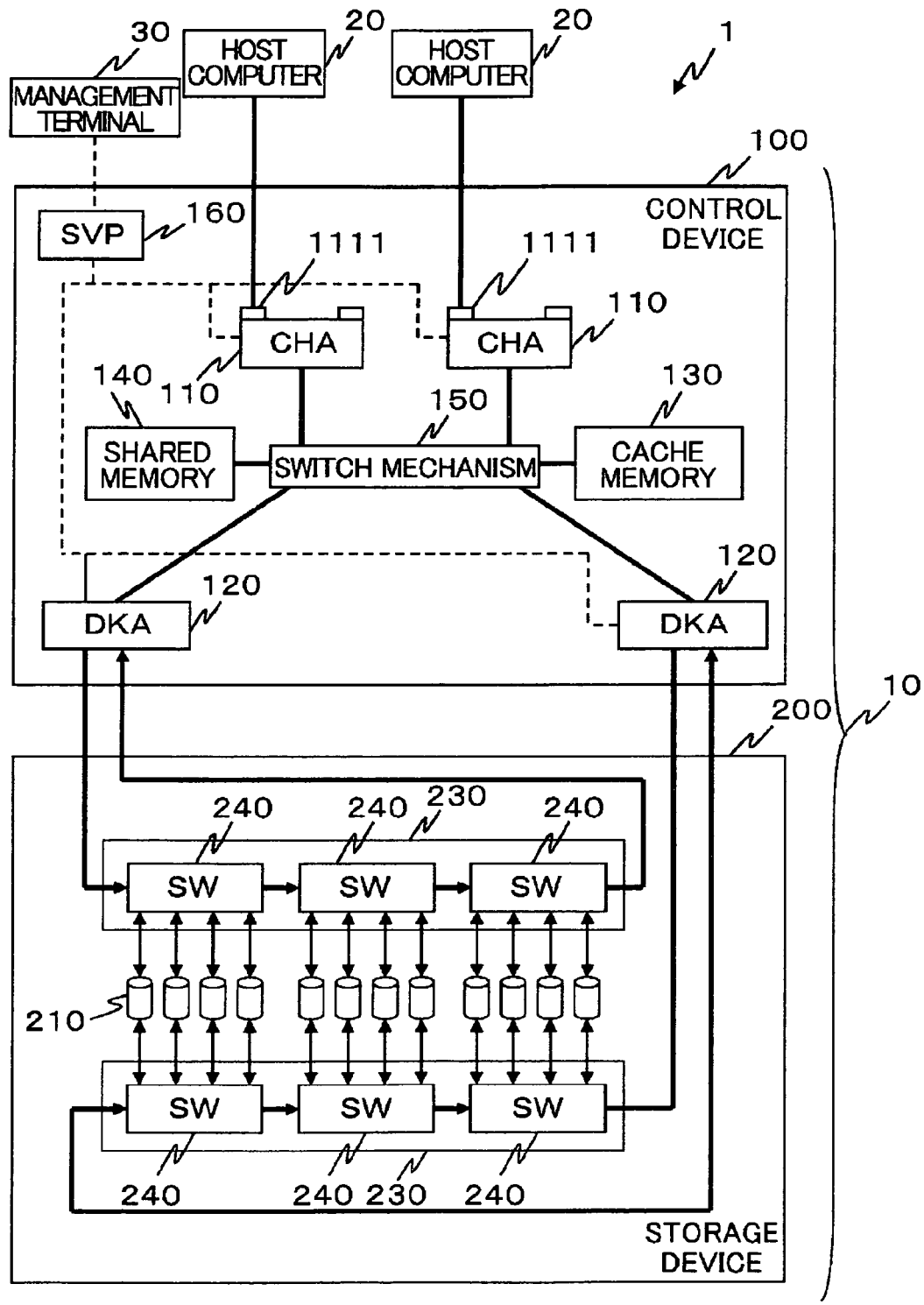
FIG. 1 is a view illustrating a hardware configuration of a storage system 1.

FIG. 1 illustrates a schematic configuration of a storage system 1 to be explained in the description of an embodiment. As illustrated in the FIG. 1, the storage system 1 includes a storage apparatuS10, a host computer 20, and a management terminal 30.

The host computer 20 and the storage apparatus 10 are coupled via a communication means 50 such as a LAN (Local Area Network), a SAN (Storage Area Network), the Internet, a public communication network, a dedicated line, and the like. Moreover, the management terminal 30 and the storage apparatus 10 are coupled via communication means 50 such as a LAN, the Internet, and the like. Note that, for example, TCP/IP is used as a LAN communication protocol. As a SAN communication protocol, for example, Fiber Channel is used. When the host computer 20 is a main frame, data transfer is performed according to a communication protocol such as FICON (registered trademark) (Fibre Connection), ESCON (registered trademark) (Enterprise System Connection), ACONARC (registered trademark) (Advance Connection Architecture), FIBARC (registered trademark) (Fibre Connection Architecture), and the like.

The host computer 20 is a computer (information processing apparatus) such as a personal computer, a workstation, a main frame, and the like. The host computer 20 is coupled to, for example, a client apparatus (not illustrated), and transmits a data input/output request to the storage apparatus 10 in response to a request sent from the client apparatus to provide various services to the client apparatus.

The storage apparatus 10 is, for example, a disk array apparatus. As illustrated in FIG. 1, the storage apparatus 10 includes a control device 100 and a storage device 200. As described later, the control device 100 and the storage device 200 are housed in different chassis, respectively, but their form of embodiment is not limited to such.

As illustrated in FIG. 1, the control device 100 includes one or more channel control units (CHA 110 (CHA: Channel Adaptor)), one or more disk control units (DKA 120 (DKA: Disk Adaptor)), one or more cache memorieS130, one or more shared memories 140, a switch mechanism 150, such as a cross bar switch, for coupling the above to one another, and a SVP (Service Processor) 160.

The storage device 200 includes one or more disk drives 210, which provide a data storage area, and one or more switches (SW 240). The disk drive 210 is, for example, a hard disk drive, but the storage device 200 may be one that provides a data storage area by use of a storage medium different from the disk drive 210, such as a SSD (Solid State Drive (Disk), an optical disk drive, a magneto-optical disk drive or the like. Note that in the following explanation, it is assumed that two types of disk drives, that is, SAS (Serial Attached SCSI) and SATA (Serial ATA) can be mounted as the disk drive 210 in the storage device 200.

The CHA 110 of the control device 100 includes one or more network ports 1111 to perform data communication between the host computer 20 and itself. When receiving a data input/output request sent from the host computer 20, the CHA 110 transmits an I/O command to a DKA 120. The CHA 110 performs data writing or reading to or from the cache memory 130 in response to the data input/output request. The data input/output request sent from the host computer 20 is a block access request where data to be inputted and outputted is specified in units of blocks (or units of chunks) or a file access request where data to be inputted and outputted is specified in units of files. In the latter case, the CHA 110 includes a function as, for example, an NAS (Network Attached Storage), and further includes functions of a file sharing system such as a NFS (Network File System and a CIFS (Common Internet File System) or the like, and a file system such as a FAT (File Allocation Table), a NTFS (NT File System), UNIX (registered trademark) file system, or the like.

Figure 2A:
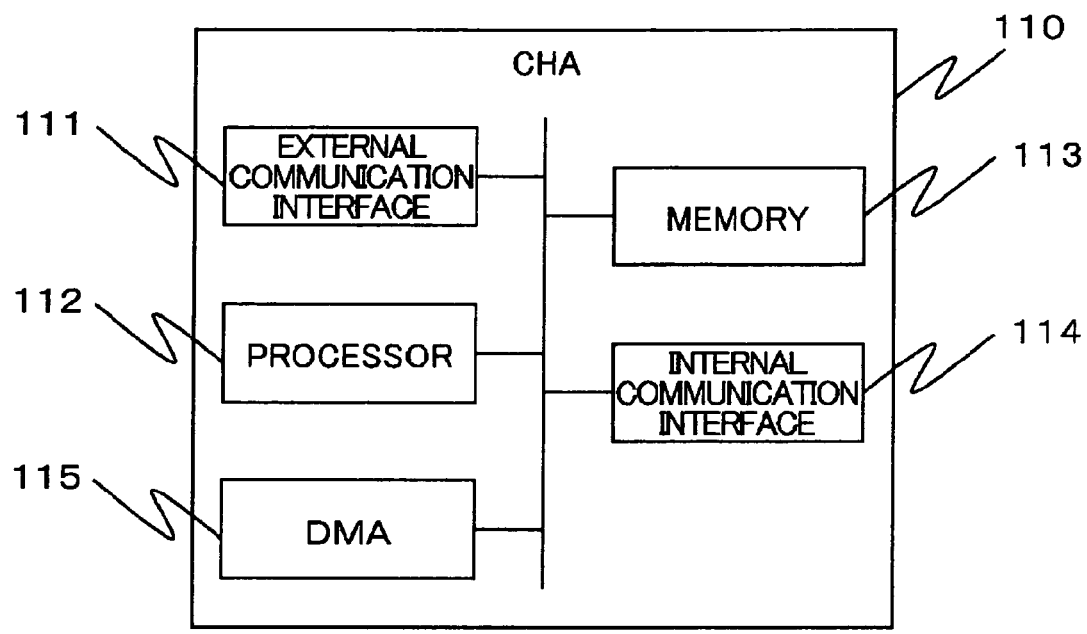
FIG. 2A is a view illustrating a hardware configuration of a CHA 110.

FIG. 2A illustrates a hardware configuration of the CHA 110. The CHA 110 includes an external communication interface 111, a processor 112, a memory 113, an internal communication interface 114, and a DMA 115 (DMA: Direct Memory Access). The external communication interface 111 includes one or more network ports 1111 and performs communication with, for example, the host computer 20 in compliance with a telecommunication standard such as Ethernet (registered trademark), Fibre Channel, or the like. The external communication interface 111 is, for example, an NIC (Network Interface Card) or a HBA (Host Bus Adaptor).

The processor 112 is, for example, a CPU (Central Processing Unit) or a MPU (Micro Processing Unit). The memory 113 is a RAM (Random Access Memory) or a ROM (Read Only Memory). The internal communication interface 114 communicates with the DKA 120, the cache memory 130, and the shared memory 140 via the switch mechanism 150. The DMA 115 speeds up data transfer between the CHA 110 and the cache memory 130. The CHA 110 performs processing mainly on those relating to the communication protocol and functions as a so-called protocol processor.

The DKA 120 of the control device 100 receives an I/O command sent from the CHA 110, and transmits control commands (Write command, Null command, Read command) to the disk drive 210 of the storage device 200 according to the received I/O command. In addition, the DKA 120 performs data writing or reading to or from the cache memory 130 according to the received I/O command.

Figure 2B:
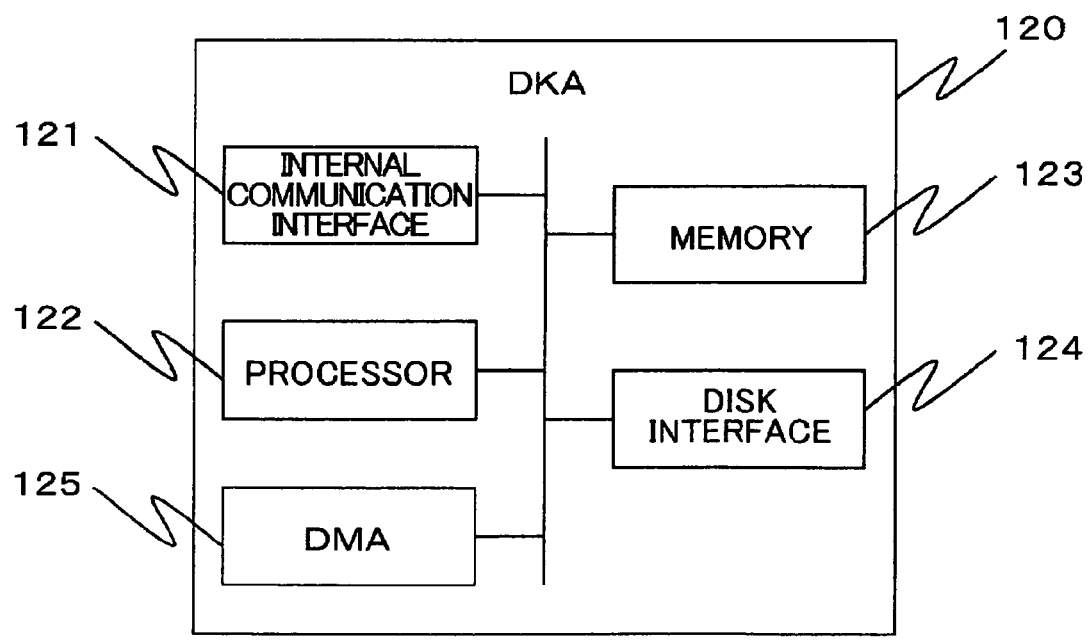
FIG. 2B is a view illustrating a hardware configuration of a DKA 120.

FIG. 2B illustrates a hardware configuration of the DKA 120. The DKA 120 includes an internal communication interface 121, a processor 122, a memory 123, a disk interface 124, and a DMA 125. The internal communication interface 121 communicates with the CHA 110, the cache memory 130 and the shared memory 140 via the switch mechanism 150. The processor 122 is, for example, a CPU or MPU. The memory 123 is a RAM or a ROM. The disk interface 124 is a device for communicating with the disk drive 210. The DMA 125 speeds up data transfer between the DKA 120 and the cache memory 130 or the disk drives 210.

In the cache memory 130, data to be written in the disk drive 210 and data read from the disk drive 210 are stored. On the other hand, in the shared memory 140, various types of control information, an I/O command to be notified from the CHA 110 to the DKA 120, and the like are stored.

When the CHA 110 receives a data write request as a data input/output request from the host computer 20, the CHA 110 writes a data write command in the shared memory 140 and writes write data received with the data write request in the cache memory 130.

The DKA 120 monitors the content of the shared memory 140. When detecting that the write command has been written in the shared memory 140, the DKA 120 reads write data from the cache memory 130 according to the command and writes the write data that is read in the disk drive 210.

When the CHA 110 receives the data read request as a data input/output from the host computer 20, the CHA 110 checks whether or not read target data is present in the cache memory 130. When the read target data is present in the cache memory 130, the CHA 110 transmits the data to the host computer 20. On the other hand, when the read target data is not present in the cache memory 130, the CHA 110 writes the read command in the shared memory 140 and monitors the shared memory 140.

When detecting that the read command has been written in the shared memory 140, the DKA 120 reads read target data from the disk drive 210 and writes the read data in the cache memory 130.

When detecting that the read target data has been written in the cache memory 130, the CHA 110 transmits the data to the host computer 20.

Note that an instruction, from the CHA 110 to the DKA 120, to write or read data is indirectly executed via the shared memory 140 as mentioned above, and besides this, there is a method that an instruction, from the CHA 110 to the DKA 120, for example, to write or read data is directly executed.

The SVP 160 is coupled to the CHA 110, the DKA 120, the cache memory 130, the shared memory 140, and the switch mechanism 150. The SVP 160 includes a CPU and a memory and can operate independently of other configuration elements in the control device 100. The SVP 160 performs monitoring, controlling and various types of settings of the storage apparatuS10 upon receipt of an operation input by a user or operator.

The disk drive 210, which is included in the storage device 200, is communicatively coupled to the DKA 120 via an SW 240 and a communication line. An SW 240 is, for example, a fiber channel switch and the communication line is, for example, an optical fiber or metal cable. In the storage apparatuS10 illustrated in FIG. 1, a FC-AL (Fibre Channel Arbitrated Loop) is formed by the SWs 240 and the communication line. The SWs 240 are provided in an FSW 230(FSW: Fibre Switch PCB) in which a multiplexer, a DC/DC converter and the like are mounted. It should be noted, in an example illustrated in FIG. 1, the FC-AL is in a redundant configuration, and each of the disk drives 210 is coupled to two FC-ALs which are respectively coupled to different DKAS120. Moreover, the SWs 240 forming the each FC-ALs belong to different FSWs 230.

The disk drives 210 may be controlled by RAID (RAID: Redundant Arrays of Inexpensive (or Independent) Disks). The disk drive 210 provides a logical storage area (logical volume) configured by using their storage areas. The logical volume is provided as a LDEV (Logical Device), which is a storage area (for example, a storage area of a RAID group) provided by RAID.

The management terminal 30 is, for example, a personal computer or an office computer. The management terminal 30 may be integrated with the storage apparatus 10 as one body. The management terminal 30 is coupled to the SVP 160. The management terminal 30 includes a user interface such as a GUI (Graphical User Interface), a CLI (Command Line Interface) or the like. The user, the operator or the like controls and monitors the storage apparatus 10 by use of the management terminal 30.

Figure 3:
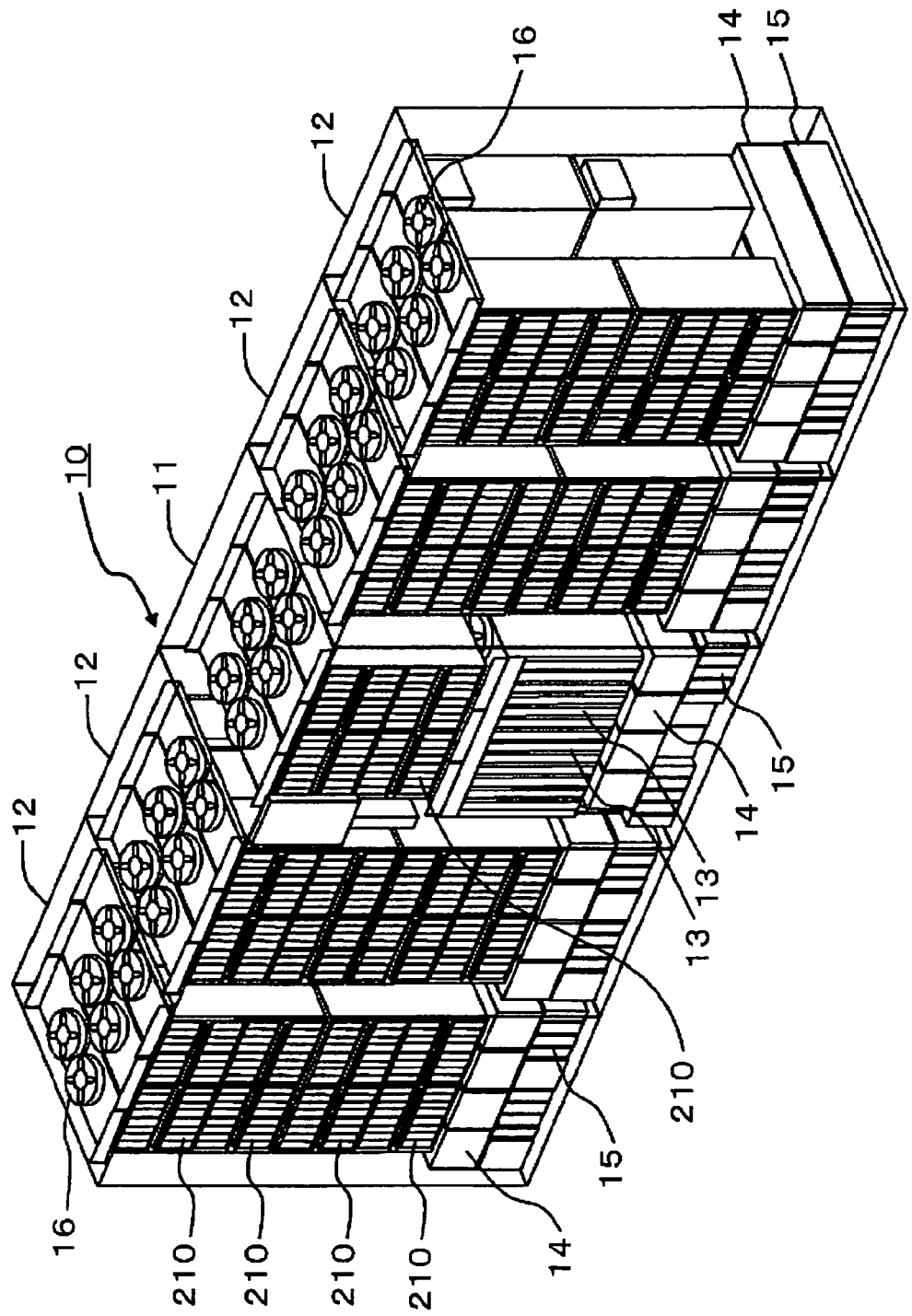
FIG. 3 is an external perspective view (one example) of a storage apparatus 10.

FIG. 3 is an external perspective view (one example) of the storage apparatus 10 having the aforementioned configuration. As illustrated in FIG. 1, the storage apparatus 10 includes one basic chassis 11 and four expansion chassis 12. The basic chassis 11 is the minimum configuration unit of the storage apparatus 10 and includes both the control device 100 and the storage device 200. The expansion chassis 12 is placed as an option of the basic chassis 11, for example, and includes the aforementioned storage device 200. The storage device 200 of the expansion chassis 12 is controlled by the control device 100 of the basic chassis 11.

The basic chassiS 11 is provided with one or more control packages 13, one or more power supply units 14, one or more battery units 15, and one or more disk drives 210, and any of these components is detachably provided. Cooling fans 16, each placed at a predetermined position, are provided at the basic chassis 11 and the expansion chassis 12. An optical fiber or metal cable included in the FC-AL is provided between the basic chassis 11 and the expansion chassis 12.

A module for achieving the CHA 110, DKA 120, cache memory 130 or shared memory 140 is mounted in the control package 13. This structure makes it possible to detachably provide CHA 110, DKA 120, cache memory 130 and shared memory 140 to the basic chassis 11 in units of control packages 13.

Figure 4:
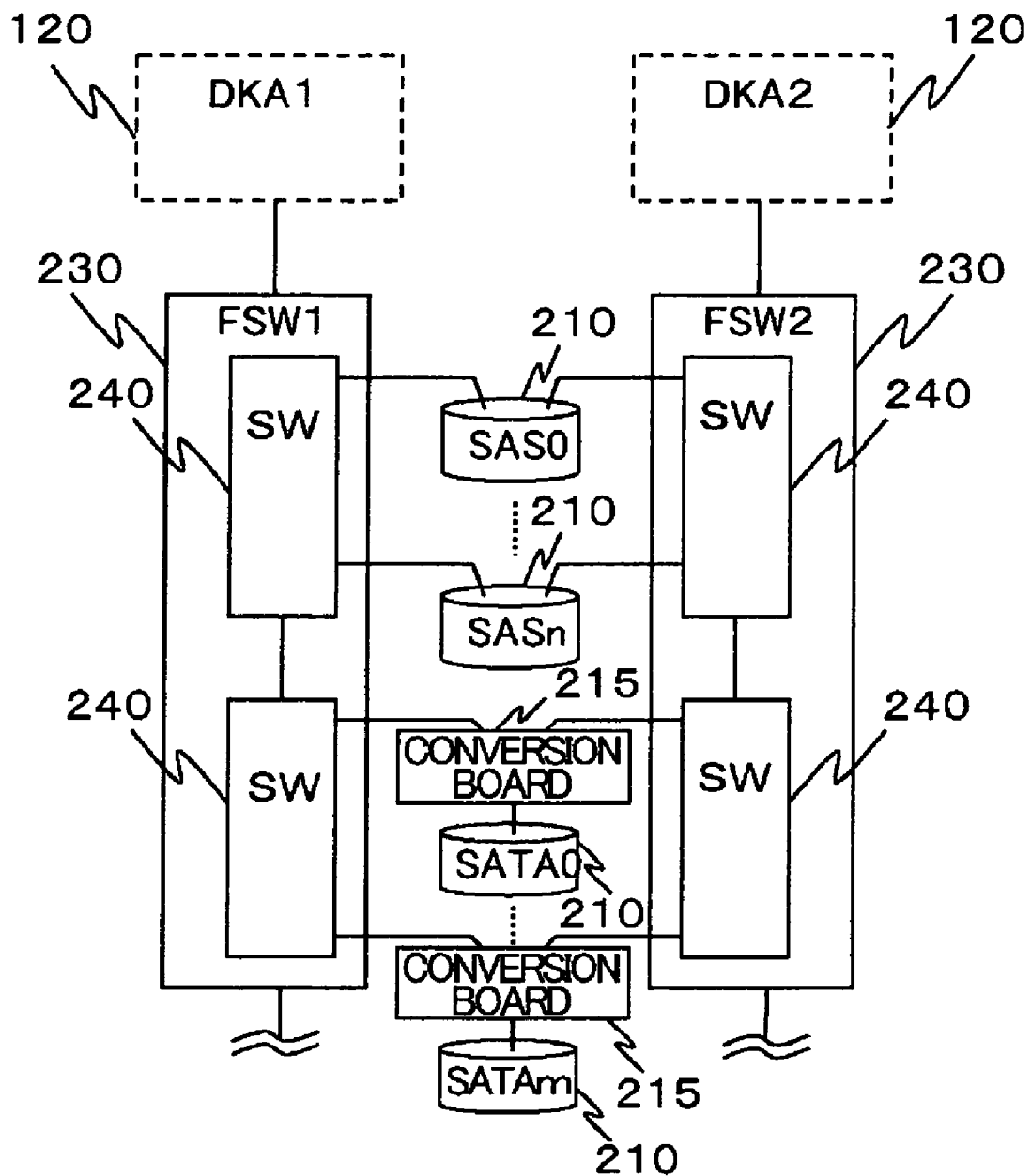
FIG. 4 is a view explaining an internal configuration of a storage device 200.

FIG. 4 is a view explaining an internal configuration of the storage device 200. As mentioned above, two types, SAS and SATA, of disk drives 210 can be mounted in the storage device 200 of the present embodiment. Note that a circuit is designed so as to use SAS type disk drives 210, with the sector size of 520 (Bytes/Sector), to be directly coupled to the SWs 240, respectively, in the storage device 200 of the present embodiment. Therefore, it is impossible to use SATA type disk drives 210, with the sector size (512 (Bytes/Sector)) different from the above, to be directly coupled to the SWs 240, respectively. For this reason, as illustrated in the figure, there are provided circuits (conversion boards 215), each between the SATA type disk drive 210 and SW 240, for converting the sector size (from 520 (Bytes/Sector) to 512 (Bytes/Sector) or vice versa) to make it possible to use the SATA type disk drives 210 to be coupled to the SWs 240. Note that description in this embodiment is made for the case of the conversion boards 215 provided on the storage device 200 side, but they may be provided on the control device 100 side.

Figure 5:
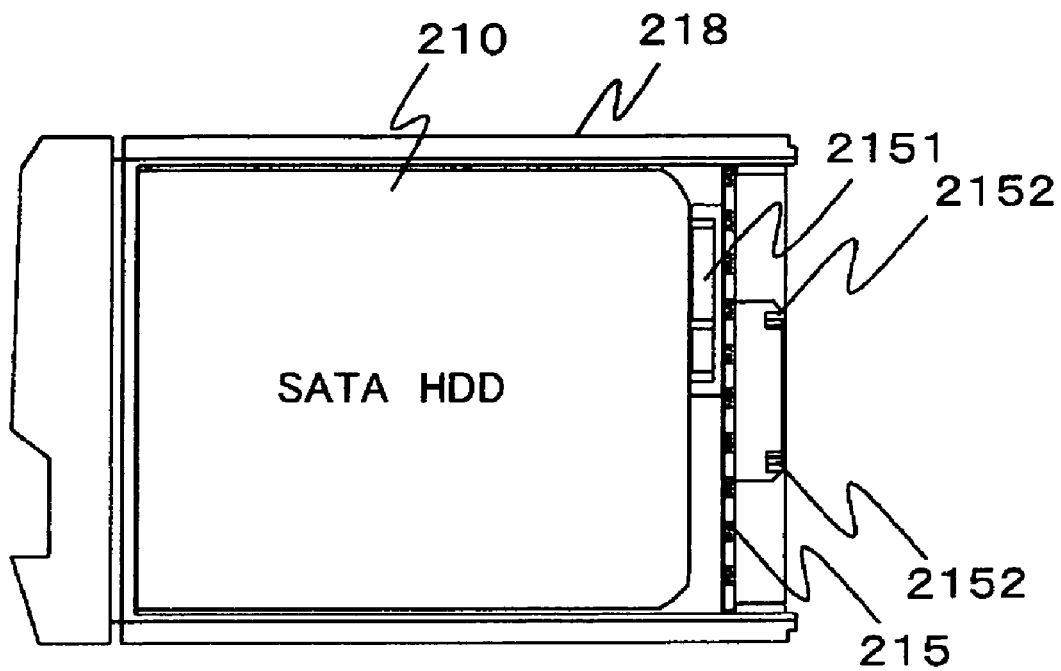
FIG. 5 is a view illustrating a mounted state (one example) of a conversion board 215.

FIG. 5 illustrates a mounted state (one example) of the above described conversion board 215. FIG. 5 illustrates a state in which the disk drive 210 is mounted on a canister 218, which is used when the disk drive 210 is mounted on the basic chassis 11 or expansion chassis 12, namely, a state in which the canister 218 and the disk drive 210 mounted thereon are seen from the side.

As illustrated in the FIG. 5, the canister 218 has an internal space where the disk drive 210 is housed, and the conversion board 215 is provided on the back face side of the disk drive housed therein. A SATA type connector 2151 is provided on one face of the disk drive 210 of the conversion board 215, and two connectors 2152 to be coupled to ports of the SWs 240 are provided on the other face. Note that the SWs 240 belonging to the different FSWs 230 are coupled to the two connectors 2152, respectively.

Figure 6:
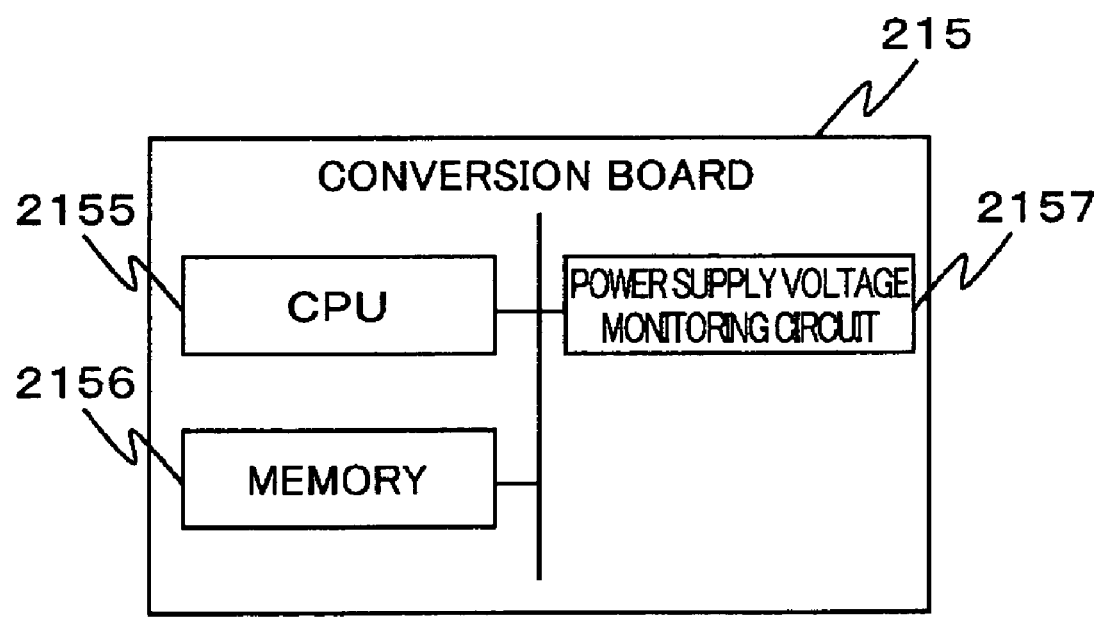
FIG. 6 is a view illustrating a hardware configuration of the conversion board 215.

FIG. 6 illustrates a hardware configuration of the conversion board 215. As illustrated in FIG. 6, the conversion board 215 includes a processor 2155 (CPU or MPU), a memory 2156 (RAM, ROM) and a power supply voltage monitoring circuit 2157 that monitors power supply voltage for driving the conversion board 215.

Figure 7:
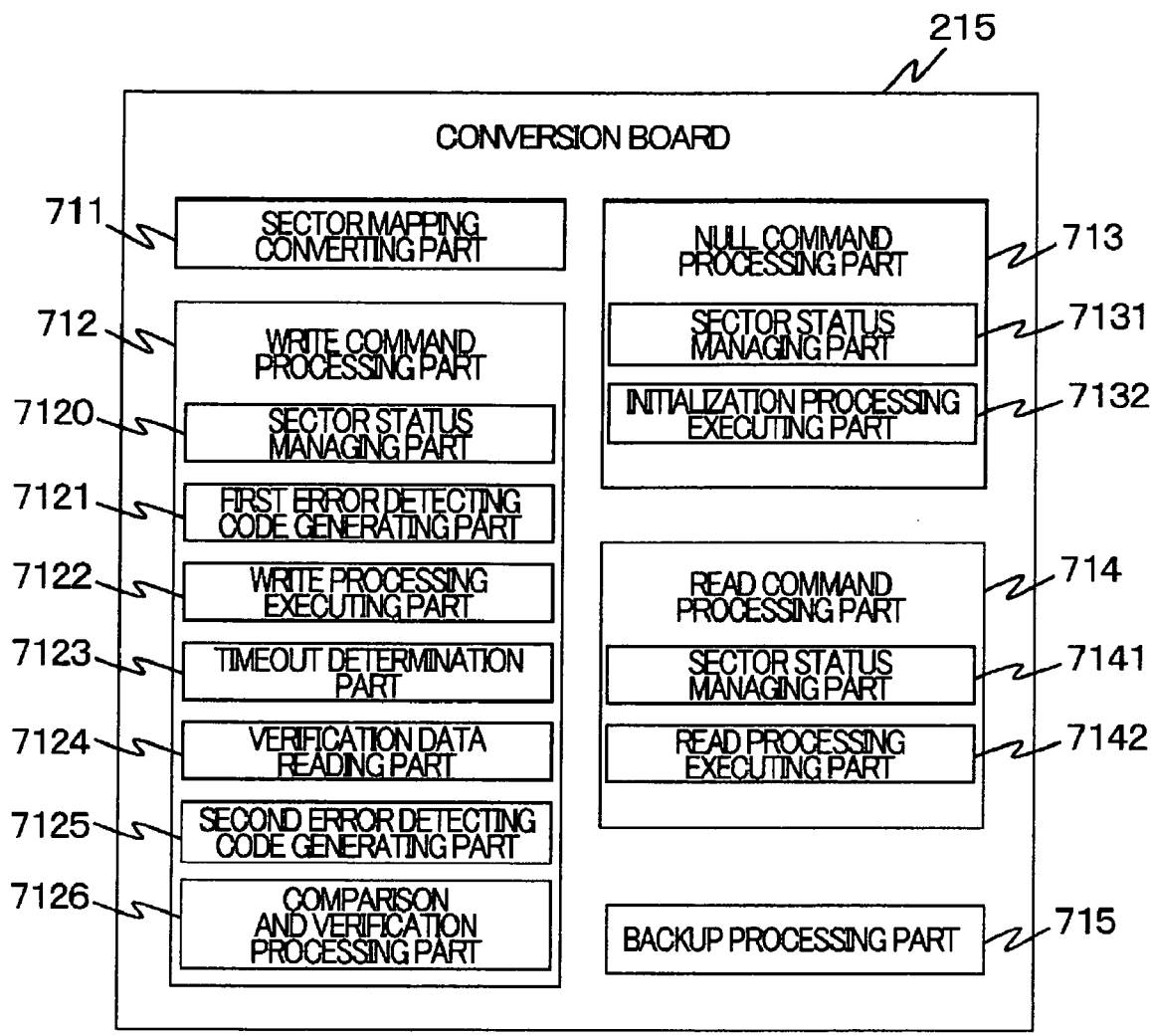
FIG. 7 is a view illustrating main functions of the conversion board 215.

FIG. 7 illustrates the main functions of the conversion board 215. As illustrated in FIG. 7, the conversion board 215 includes a sector mapping converting part 711, a Write command processing part 712, a Null command processing part 713, a Read command processing part 714, and a backup processing part 715. Note that each function illustrated in FIG. 7 is achieved by the functions which the conversion board 215 originally includes or by the CPU 2155 executing a program stored in the memory 2156.

Among the functions illustrated in FIG. 7, the sector mapping converting part 711 performs conversion of the sector size. Namely, when receiving a control command, where a storage position of data (cylinders, tracks, sectors in the case of SAS) is specified in SAS format (520 (Bytes/Sector)), from the DKA 120 via the SWs 240, the sector mapping converting part 711 converts the specification of the format into SATA type format (512 (Bytes/Sector)) and obtains a storage position of corresponding data in the SATA type disk drive 210 (storage position specified by cylinders, tracks, sectors in the case of SATA).

Figure 8A:
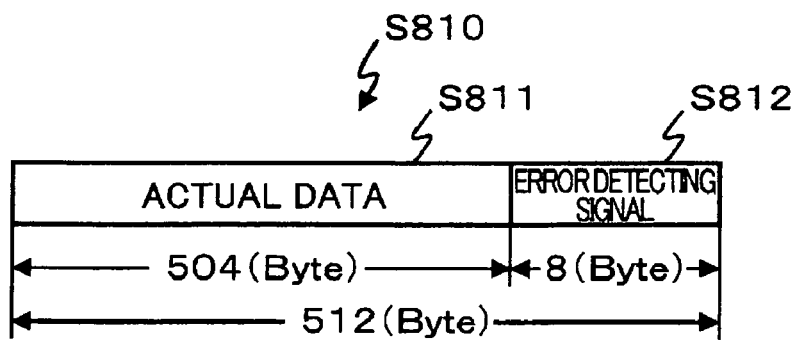
FIG. 8A is a view illustrating a data frame structure of a SATA type disk drive 210.

FIG. 8A illustrates a configuration of a data frame corresponding to the sector size (512 (Bytes/Sector)) in the SATA type disk drive (data frame transmitted together with the control command transmitted to the conversion board 215 from the DKA 120). As illustrated in FIG. 8A, a data frame 810 has a data area 811 of 504 bytes that stores therein write data or read data, and a data area 812 of 8 bytes that stores therein error detecting codes (CRC (Cyclic Redundancy Check), LRC (Longitudinal Redundancy Check), and the like), which are calculated from data stored in the area.

Figures 8B, 9:
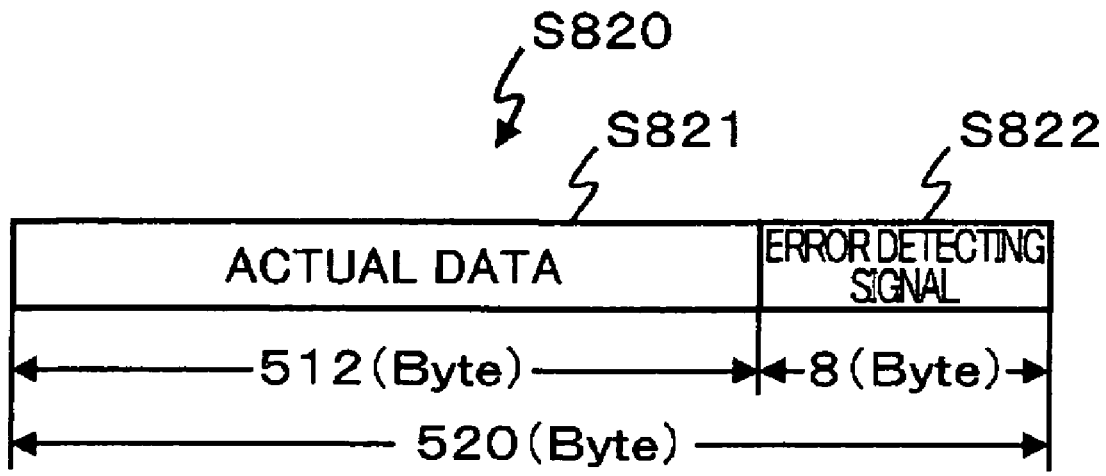
FIG. 8B is a view illustrating a data frame structure of a SAS type disk drive 210.
FIG. 9 is a view illustrating a sector status management table 900.

FIG. 8B illustrates a configuration of a data frame corresponding to the sector size (520 (Bytes/Sector)) of the SAS type disk drive (data frame after conversion to SAS type performed by the conversion board 215). As illustrated in FIG. 8B, a data frame 820 has a data area 821 of 512 bytes that stores therein write data or read data, and a data area 822 of 8 bytes that stores therein error detecting codes, which are calculated from data stored in the area.

FIG. 9 is a sector status management table 900 (unit storage area status management table) stored in the memory 2156 of the conversion board 215. As illustrated in FIG. 9, information, indicating whether or not effective data is currently stored in each sector of the disk drive 210, is managed in the sector status management table 900. In FIG. 9, a LBA (Logical Block Address), which is information identifying (distinguishing) each sector of the disk drive 210, is set in a LBA 911. Note that the LBA may be one that identifies the SAS type (520 (Bytes/Sector)) sector, or one that identifies the SATA type (512 (Bytes/Sector)) sector. In the present embodiment, it is assumed that the LBA is one that identifies the SATA type (512 (Bytes/Sector)) sector.

When effective data is currently stored in the sector identified by the corresponding LBA, "1" is set to a flag 912, while when effective data is not stored therein, "0" is set to the flag 912. Details on the use of the sector status management table 900, its update method and the like will be described later. In addition, details on the respective functions of the Write command processing part 712, the Null command processing part 713, the Read command processing part 714 and the backup processing part 715 will be described later.

=Explanation of Processing=

Next, a detailed explanation will be given of processing performed in the DKA 120, the conversion board 215 and the disk drive 210 of the storage apparatus 10. In the following explanation, it should be noted that a letter of "S" attached before a reference numeral means step.

<Write Processing>

Figure 10:
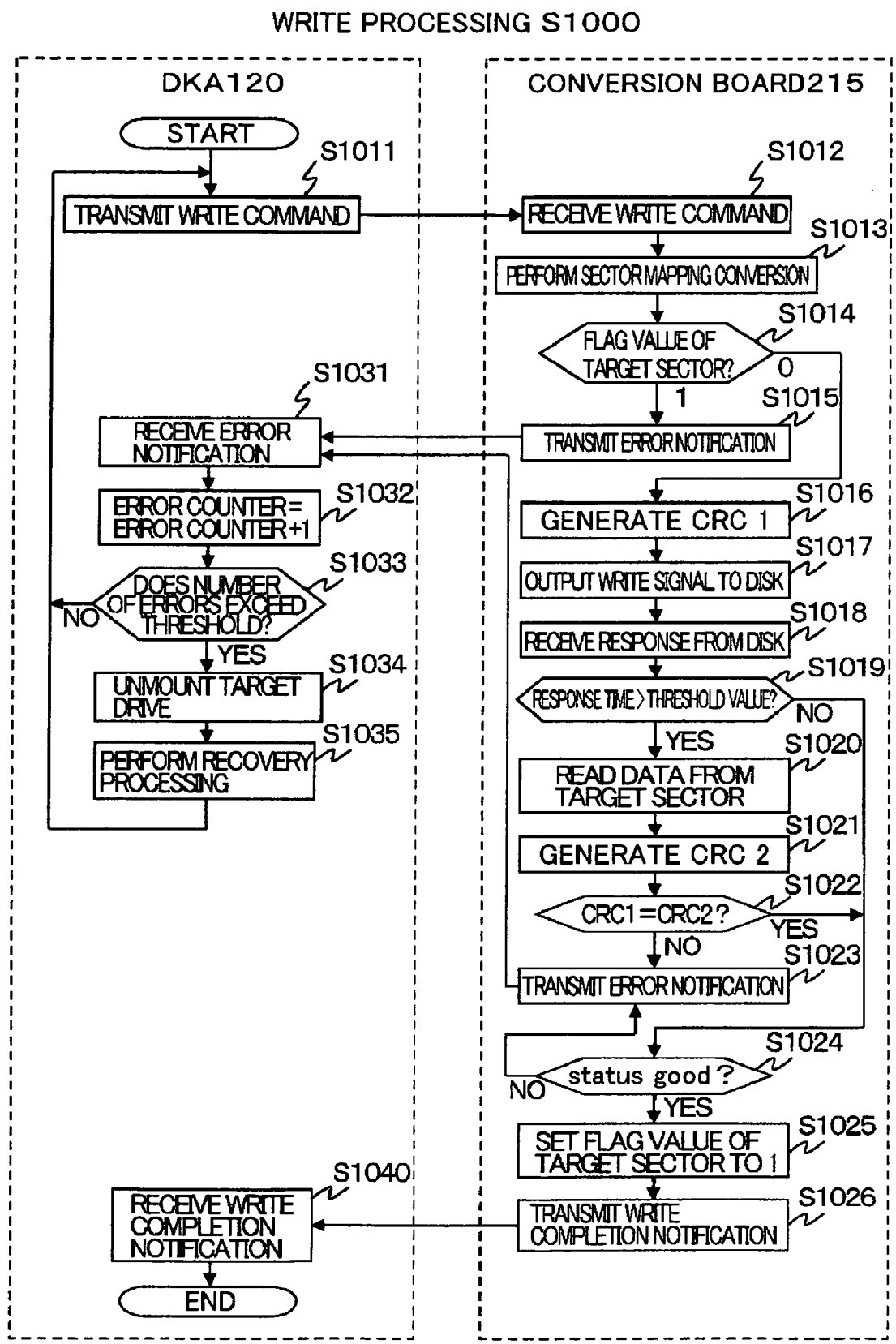
FIG. 10 is a flowchart explaining Write processing S1000.

FIG. 10 is a flowchart explaining processing performed between the DKA 120 and the conversion board 215 when a Write command as a control command is transmitted to the conversion board 215 from the DKA 120 (hereinafter referred to as Write processing S1000). Note that the Write command is a command that specifies writing (storage) of write data to a target sector of the disk drive 210. In the following, explanation on Write processing S1000 with reference to FIG. 10 will be given.

When a Write command is transmitted from the DKA 120 (S1011), the conversion board 215 receives this command (S1012).

Next, the sector mapping converting part 711 of the conversion board 215 converts a SAS type (520 (Bytes/Sector)) LBA, which is specified as a write data writing destination by the Write command, into a SATA type (512 (Bytes/Sector)) LBA (S1013).

Next, a sector status managing part 7120 of the Write command processing part 712 of the conversion board 215 checks a flag value corresponding to the LBA specified by the received Write command with reference to the sector status management table 900 (S1014). When the flag value is "1" (51014:1), the processing goes-to S1015. When the flag value is "0" (S1014: 0), the processing goes to S1016.

In S1015, the Write command processing part 712 transmits an error notification to the DKA 120 (generates a signal representing that write processing has not been normally performed). The reason why the error notification is transmitted to the DKA 120 when the flag value is "1" in this way is that data will be overwritten on the sector where effective data is currently written.

On the other hand, in S1016, a first error detecting code generating part 7121 of the Write command processing part 712 generates an error detecting code (first error detecting code) based on the write data received together with the Write command and stores the error detecting code in the memory 2156 (S1016). Note that it is assumed that the error detecting code is a CRC and the CRC generated here is hereinafter called CRC 1.

Sequentially, in S1017, a write processing executing part 7122 of the Write command processing part 712 outputs a Write signal (executes write processing) to the disk drive 210, a timeout determining part 7123 of the Write command processing part 712 starts measuring response time (period of time from when the Write signal is outputted to when a response indicating completion of write processing is received from the disk drive 210).

In S1018, the Write command processing part 712 receives a response sent from the disk drive 210.

In S1019, the timeout determining part 7123 of the Write command processing part 712 determines whether or not response time exceeds a predetermined threshold vale. When the response time exceeds the threshold value (51019: YES), the processing goes to S1020. When the response time does not exceed the threshold value (S1019: NO), the processing goes to S1024.

In S1020, a verification data reading part 7124 of the Write command processing part 712 reads data stored in a sector that is a target of the Write command received this time (a sector as a write data writing destination, hereinafter called as a target sector).

Sequentially, in S1021, a second error detecting code generating part 7125 of the Write command processing part 712 generates an error detecting code (second error detecting code) based on the read data (S1021). Note that it is assumed that the error detecting code is a CRC and the CRC generated here is hereinafter called CRC 2.

In S 1022, a comparison and verification processing part 7126 of the Write command processing part 712 compares the CRC 1 stored in the memory 2156 in S1016 with the CRC 2 generated in S 1021, and determines whether or not the two coincide with each other. When the two coincide with each other (S 1022: YES), the processing goes to S1024 (S1022: YES). When the two do not coincide with each other (S 1022: NO), the processing goes to S 1023.

In S 1023, the comparison and verification processing part 7126 of the Write command processing part 712 transmits an error notification to the DKA 120 (generates a signal representing that write processing has not been normally performed).

In S1024, the Write command processing part 712 determines whether or not the content of the response from the disk drive 210 is in a good status. When it is in a good status, the processing goes to 51025. When it is not in a good status, the processing goes to S1023 and transmits an error notification to the DKA 120.

Note that as a case in which it is determined not to be in a good status in S1024, there is a case in which no response is transmitted from the disk drive 210 even if waiting continues for a predetermined threshold time or more (threshold value different from that in S1019 (WR_TOV: Write Time Over threshold). This threshold value is longer than that in S 1019)).

In S1025, the Write command processing part 712 sets the value of the flag 912 of the LBA 911 of the target sector in the sector status management table 900 to "1."

In S 1026, the Write command processing part 712 transmits a Write completion notification to the DKA 120.

Thus, when receiving the Write command from the DKA 120 (S 1012), the Write command processing part 712 of the conversion board 215 generates a CRC 1 if the flag value of the target sector is "0." Then, regarding a Write signal, when the response time of the disk drive 210 exceeds the threshold value (S 1019: YES), the Write command processing part 712 reads data from the target sector, generates a CRC 2 based on the read data, and makes a comparison between the CRC 2 and the CRC 1 to determine whether or not write data has been correctly written in the target sector.

More specifically, in the storage apparatus 10 of the present embodiment, only when the response time of the disk drive 210 exceeds the threshold value, verification of the detection error code is performed, and therefore it is possible to perform speedy processing on the Write command unless the response time exceeds the threshold time. Note that generation of CRC 1 is performed even when the response time does not exceed the threshold value, but a load for generating the CRC 1 is generally small and overhead for write processing is little affected by CRC 1 generation processing.

Moreover, when the response time exceeds the threshold value, verification of the detection error code is performed, and therefore it is possible to ensure reliability of data stored in the disk drive 210.

It should be noted that the following example shows the case in which the response time to the Write signal transmitted to the disk drive 210 from the conversion board 215 exceeds the threshold value. Data cannot be written for some reason in the storage area of the disk drive 210 as the writing destination specified by the Write signal, and therefore writing is retried repeatedly, resulting in the successful writing. Specifically, the SATA type disk drive 210 has an auto reassign function in which when writing data to a built-in disk fails, writing is automatically retried repeatedly internally by a built-in analog circuit, and when the number of times of retry exceeds a predetermined number, data is written to another sector. And, when this auto assign function is operates, the response time exceeds the threshold value in some cases.

To allow a user or an operator to set the threshold value in S 1019, a user interface for that such purpose may be provided in the SVP 160, for example. In this case, for example, the user interface updates the threshold value stored in the memory 2156 of the conversion board 215 via the DKA 120.

The CRC 1 generated in 51016 can be used for the purpose of verifying data stored in the disk drive 210 by transmitting the CRC 1 to the DKA 120 to be compared, at the DKA 120, with the CRC 1, which is based on data to be stored (or already stored) in the corresponding sector obtained from the cache memory 130.

Explanation will continue with reference to FIG. 10. In S1031, the DKA 120 receives the error notification transmitted from the conversion board 215 in S 1015.

In S 1032, the DKA 120 increments a value of an error counter. In S 1033, the DKA 120 determines whether or not the number of errors exceeds a predetermined threshold value. When the number of errors does not exceed the threshold value (S 1033: NO), the processing goes to S 1011 and the DKA 120 transmits the Write command to the conversion board 215 again. When the number of errors exceeds the threshold value (S 1033: YES), the processing goes to S1034.

In S1034, the DKA 120 unmounts the disk drive 210 specified as a write data writing destination according to the Write command.

In S1035, the DKA 120 performs recovery processing of the unmounted disk drive 210. The recovery processing is one in which, for example, when the unmounted disk drive 210 configures a RAID group of RAIDs 5, data stored in the unmounted disk drive 210 is supplied based on data stored in another disk drive 210 (including a parity drive) belonging to the RAID group. The recovery processing is also one that replaces the unmounted disk drive 210 with a spare disk and generates data stored in the unmounted disk 210 based on data stored in another disk drive 210 (including a parity drive) belonging to the RAID group and stores the generated data in the replaced spare disk.

In S 1040, the DKA 120 receives the Write completion notification transmitted from the conversion board 215.

Figure 11:
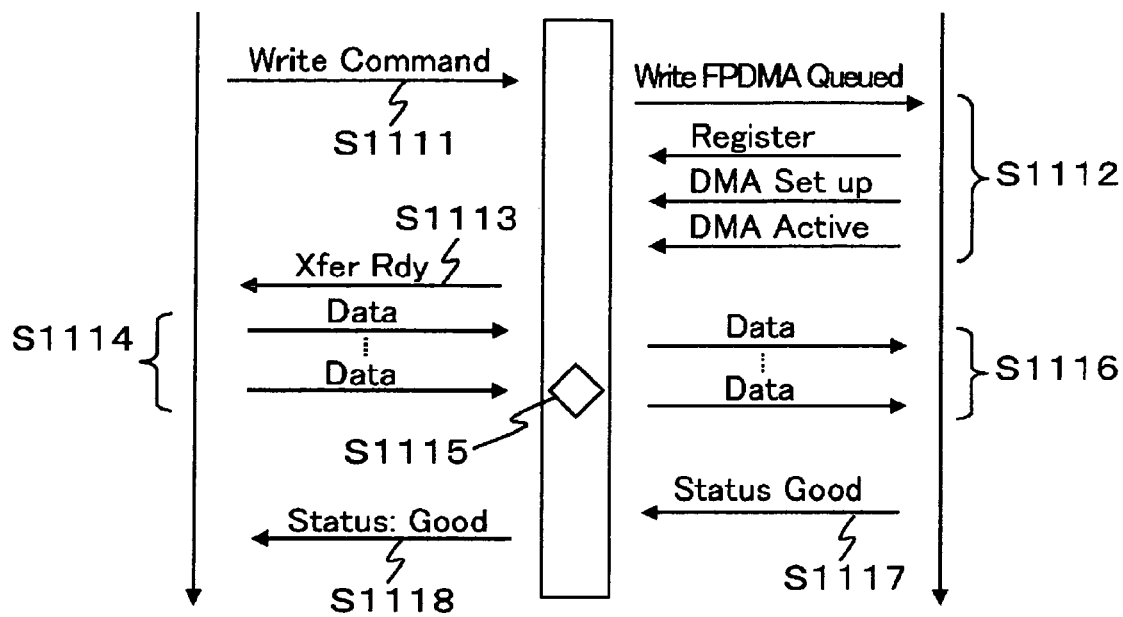
FIG. 11 is a view explaining a communication sequence which is performed among the DKA 120, the conversion board 215 and the disk drive 210 to deal with the case when response time does not exceed a threshold value in S1019 in FIG. 10.

FIG. 11 is a view explaining a communication sequence, which is performed among the DKA 120, the conversion board 215 and the disk drive 210 to deal with the case when the response time does not exceed the threshold value in S 1019 in FIG. 10.

In S1111, the DKA 120 transmits the Write command to the conversion board 215.

In S1112, a preparation sequence (DMA setup) of data transfer for data writing to the disk drive 210 is performed between the conversion board 215 and the disk drive 210.

In S1113, a data transfer preparation completion notification is transmitted from the conversion board 215 to the DKA 120.

In S1114, data is transferred to the conversion board 215 from the DKA 120.

In S1115, the conversion board 215 generates a CRC 1 based on data received from the DKA 120 and stores the CRC 1.

In S1116, data is transferred to the disk drive 210 from the conversion board 215.

In S1117, the Write completion notification is transmitted to the conversion board 215 from the disk drive 210.

In S1118, the Write completion notification is transmitted to the DKA 120 from the conversion board 215.

Figure 12:
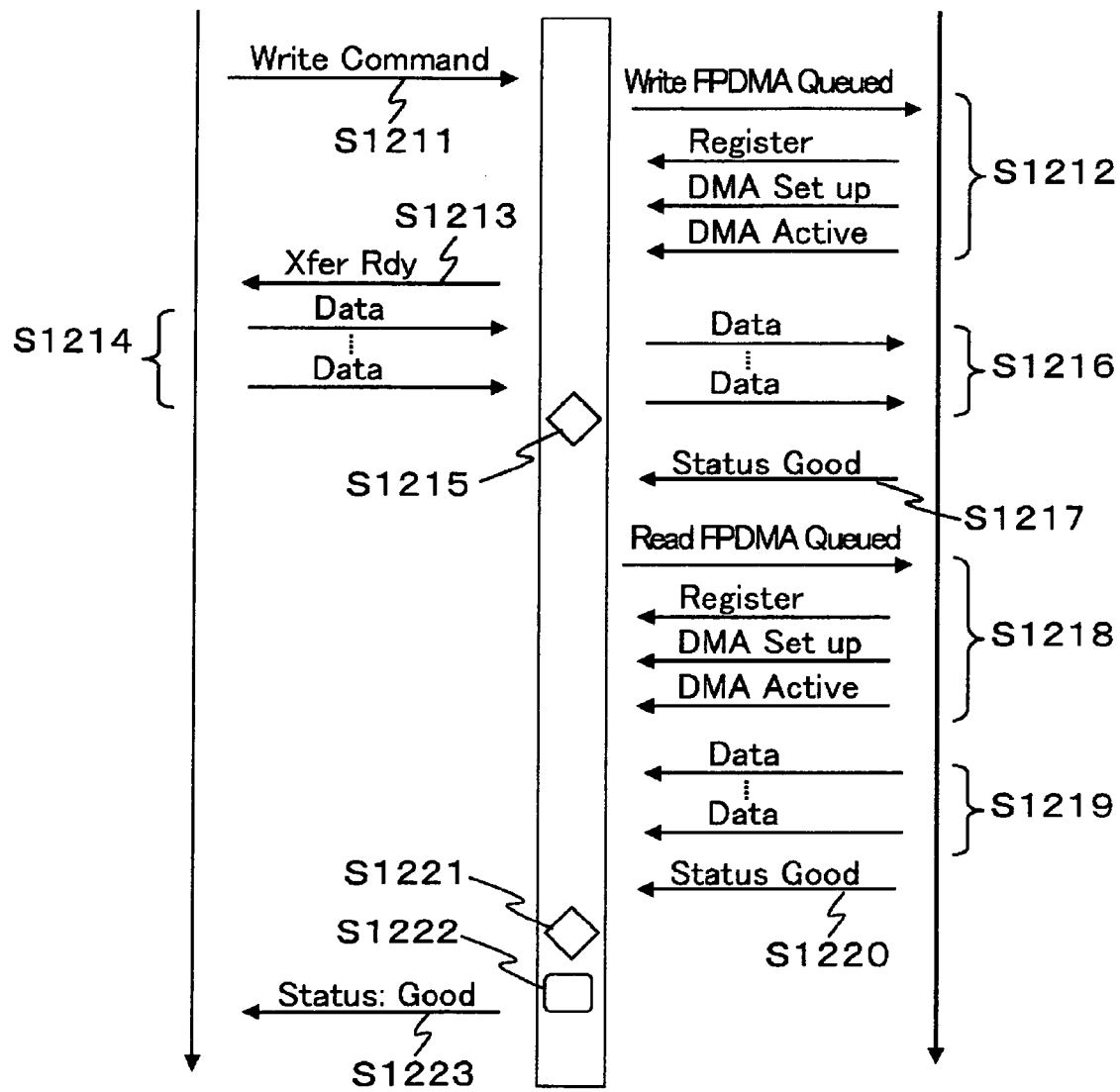
FIG. 12 is a view explaining a communication sequence which is performed among the DKA 120, the conversion board 215 and the disk drive 210 to deal with the case when the response time exceeds the threshold value in S 1019 in FIG. 10.

FIG. 12 is a view explaining a communication sequence, which is performed among the DKA 120, the conversion board 215 and the disk drive 210 to deal with the case when the response time exceeds the threshold value in S1019 of FIG. 10.

Processing in S1211 to S1217 is the same as that in S1111 to S1117 in FIG. 11.

In S 1218, a preparation sequence (DMA setup) of data transfer for data reading from the disk drive 210 is performed between the conversion board 215 and the disk drive 210.

In S 1219, data is read from the disk drive 210 to the conversion board 215.

In S1220, a read completion notification is transmitted from the disk drive 210 to the conversion board 215.

In S 1221, the conversion board 215 generates a CRC 2 based on data read from the disk drive 210.

In S1222, the conversion board 215 makes a comparison between the CRC 1 and the CRC 2. Note that FIG. 12 illustrates a case in which the CRC 1 and the CRC 2 coincide with each other in S1022 of FIG. 10.

In S1223, the Write completion notification is transmitted to the DKA 120 from the conversion board 215.

<Null Processing>

Figure 13:
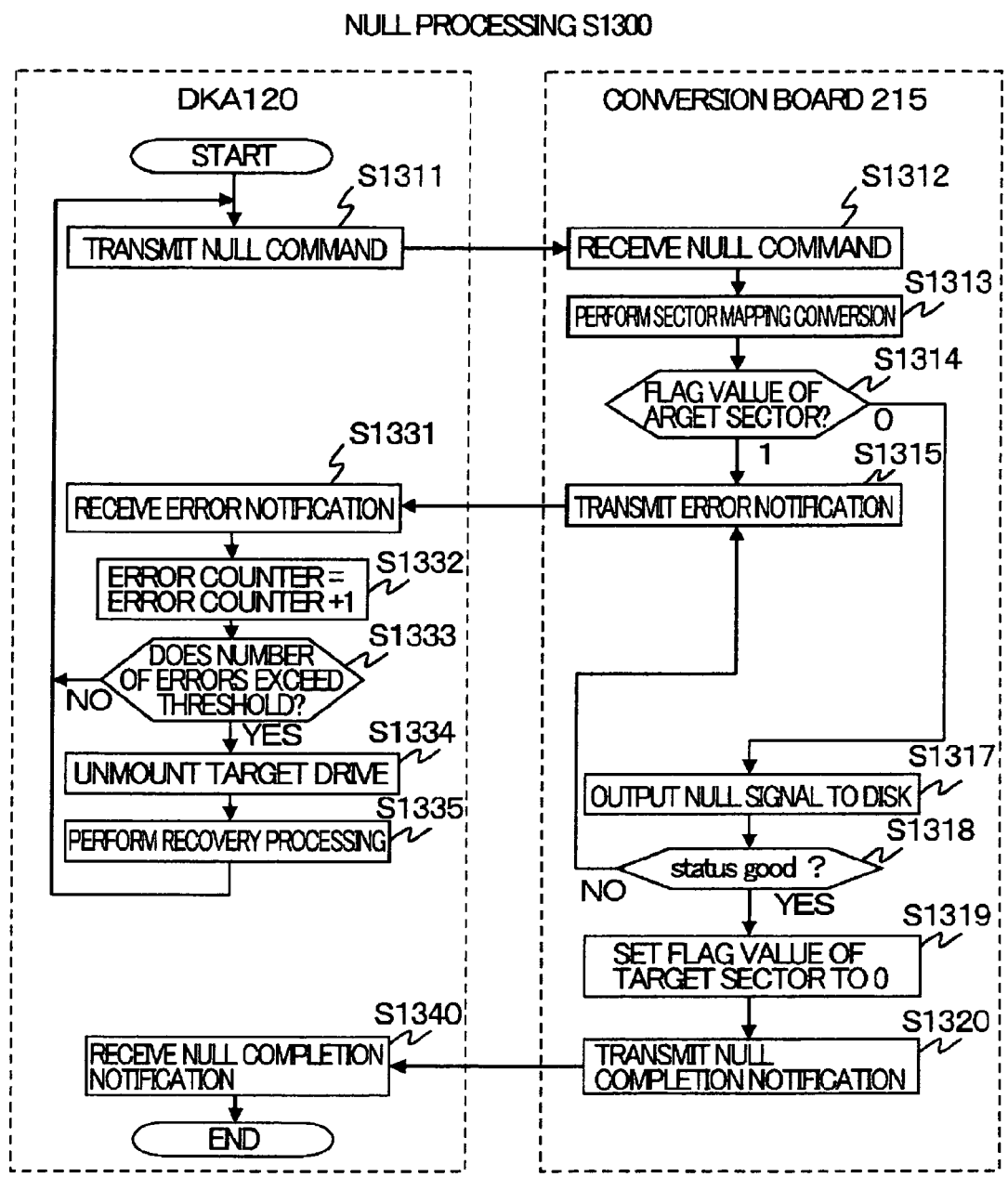
FIG. 13 is a flowchart explaining Null processing S1300.

FIG. 13 is a flowchart explaining processing performed between the DKA 120 and the conversion board 215 when a Null command as a control command is transmitted from the DKA 120 to the conversion board 215 (hereinafter referred to as Null processing S1300). Note that the Null command is a command for instructing initialization of the target sector of the disk drive 210 (a command for storing a Null value). In the following, explanation will be given on Null processing S1300 with reference to FIG. 13.

When a Null command is transmitted from the DKA 120 (S1311), the conversion board 215 receives the Null command (S1312).

Next, the sector mapping converting part 711 of the conversion board 215 converts a SAS type (520(Bytes/Sector)) LBA, which is specified as a write data writing destination by the Null command, into a SATA type (512(Bytes/Sector)) LBA (S1313).

Next, a sector status managing part 7131 of the Null command processing part 713 of the conversion board 215 checks a value of a flag corresponding to the LBA specified by the received Null command with reference to the sector status management table 900 (S1314). When the value of the flag is "1" (S1314: 1), the processing goes to S1315. When the value of the flag is "0" (S1314: 0), the processing goes to S1317.

In S1315, the sector status managing part 7131 of the Null command processing part 713 transmits an error notification to the DKA 120. The reason why the error notification is thus transmitted to the DKA 120 when the flag value is "1" in this way is that a Null value will be stored in the sector where effective data is currently written.

In S1317, an initialization processing executing part 7132 of the Null command processing part 713 outputs a Null signal (signal that causes Null to be stored in the target sector) to the disk drive 210.

In S1318, the Null command processing part 713 determines whether or not the content of the response from the disk drive 210 is in a good status. When it is in a good status, the processing goes to S1319. When it is not in a good status, the processing goes to S1315 and transmits an error notification to the DKA 120.

In S1319, the sector status managing part 7131 of the Null command processing part 713 sets the value of the flag 912 of the LBA 911 of the target sector in the sector status management table 900 to "0." By this means, it is possible to perform writing to the sector.

In S1320, the Null command processing part 713 transmits a Null completion notification to the DKA 120.

Processing of the DKA 120 in S1331 to S1335 and S1340 are the same as that in S1031 to S1035 and S1040 in FIG. 10, and therefore explanation here will be omitted.

In this way, upon receiving the Null command from the DKA 120 (S1312), the Null command processing part 713 of the conversion board 215 outputs the Null signal to the disk drive 210 (S1317) when the flag value of the target sector is "0." However, the Null command processing part 713 does not basically execute processing, which is executed in Write processing S1000, such as measuring response time and comparing response time with the threshold value, generating and comparing CRC, etc., as in the case where the Write command is received (S1012). Therefore, it is possible to execute processing of the Null command at high speed.

<Read Processing>

Figure 14:
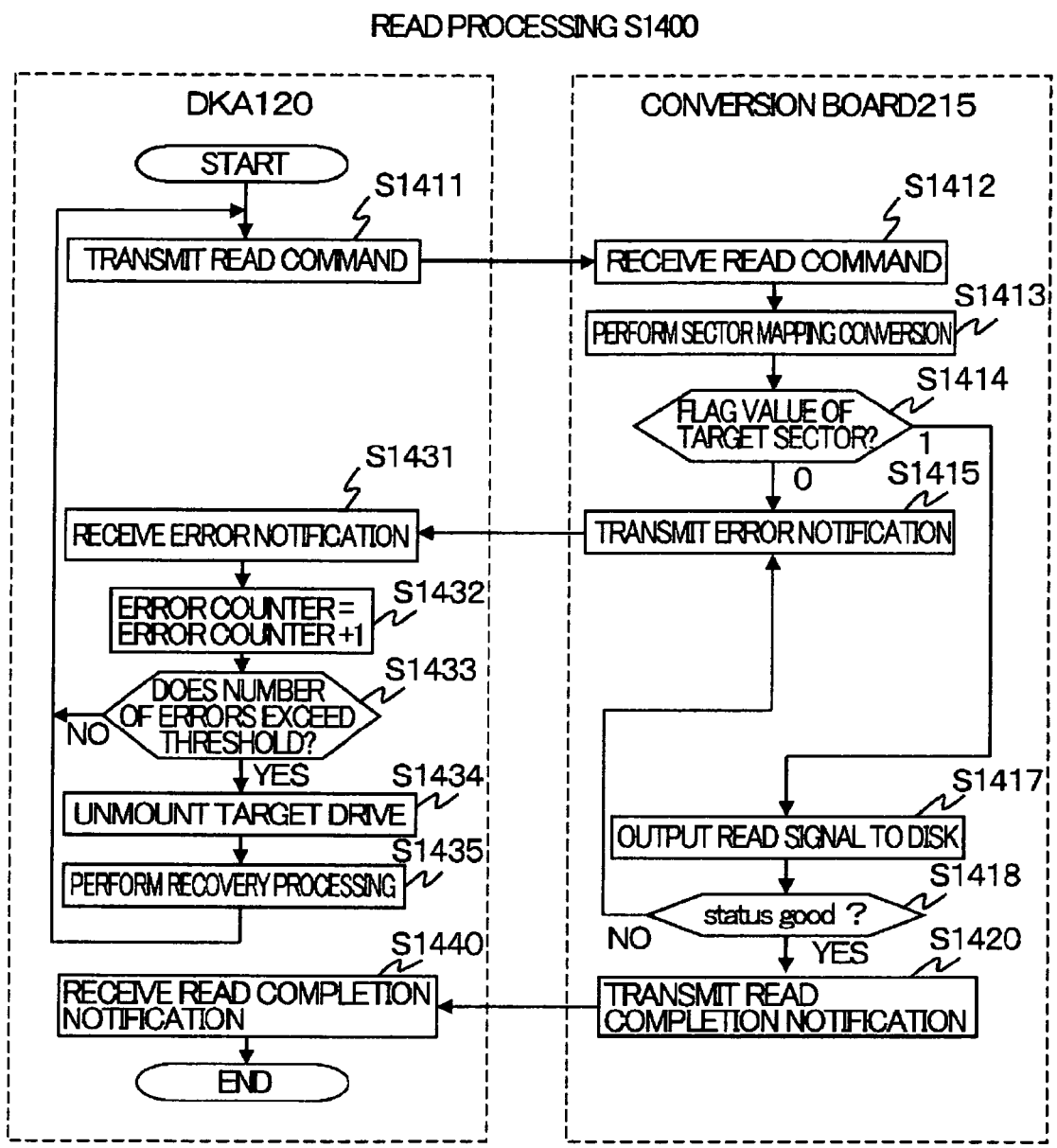
FIG. 14 is a flowchart explaining Read processing S1400.

FIG. 14 is a flowchart explaining processing performed between the DKA 120 and the conversion board 215 when a Read command as a control command is transmitted from the DKA 120 to the conversion board 215 (hereinafter referred to as Read processing S1400). Note that the Read command is a command for instructing data reading from the target sector of the disk drive 210. In the following, explanation is given on read processing 51400 with reference to FIG. 14.

When a Read command is transmitted from the DKA 120 (S1411), the conversion board 215 receives the Read command (S1412).

Next, the sector mapping converting part 711 of the conversion board 215 converts a SAS type (520(Bytes/Sector) LBA, which is specified as a read data storage position by the Read command, into a SATA type (512(Bytes/Sector)) LBA (S 1413).

Next, a sector status managing part 7141 of the read command processing part 714 of the conversion board 215 checks a value of a flag corresponding to the LBA specified by the received Read command with reference to the sector status management table 900 (S1414). Then, when the value of the flag is "0" (S1414: 0), the processing goes to S1415 and when the value of the flag is "1" (S1414: 1), the processing goes to S1416.

In S1415, the sector status managing part 7141 of the Read command processing part 714 transmits an error notification to the DKA 120. The reason why the error notification is thus transmitted to the DKA 120 when the flag value is "0" is that data is attempted to be read from the sector where effective data is not currently written.

In S 1417, a read processing executing part 7142 of the Read command processing part 714 outputs a Read signal (signal that reads data stored in a target sector) to the disk drive 210.

In S1418, the Read command processing part 714 determines whether or not the content of the response from the disk drive 210 is in a good status. When it is in a good status, the processing goes to S1419. When it is not in a good status, the processing goes to S1415 and transmits an error notification to the DKA 120.

In S1420, the Read command processing part 714 transmits a Read completion notification to the DKA 120. Processing of the DKA 120 in S1431 to S1435 and S1440 are the same as that in S1031 to S1035 and S1040 in FIG. 10 and therefore explanation here will be omitted.

In this way, upon receiving the Read command from the DKA 120 (S 1412), the Read command processing part 714 of the conversion board 215 outputs the Read signal to the disk drive 120 (S1417) when the flag value of the target sector is "1." However, the Read command processing part 714 does not basically execute processing, which is executed in Write processing S1000, such as measuring response time and comparing response time with the threshold value, generating and comparing CRC, etc., as in the case where the Write command is received(S1012). Therefore, it is possible to execute processing of the Read command at high speed.

<Backup Processing>

Figure 15:
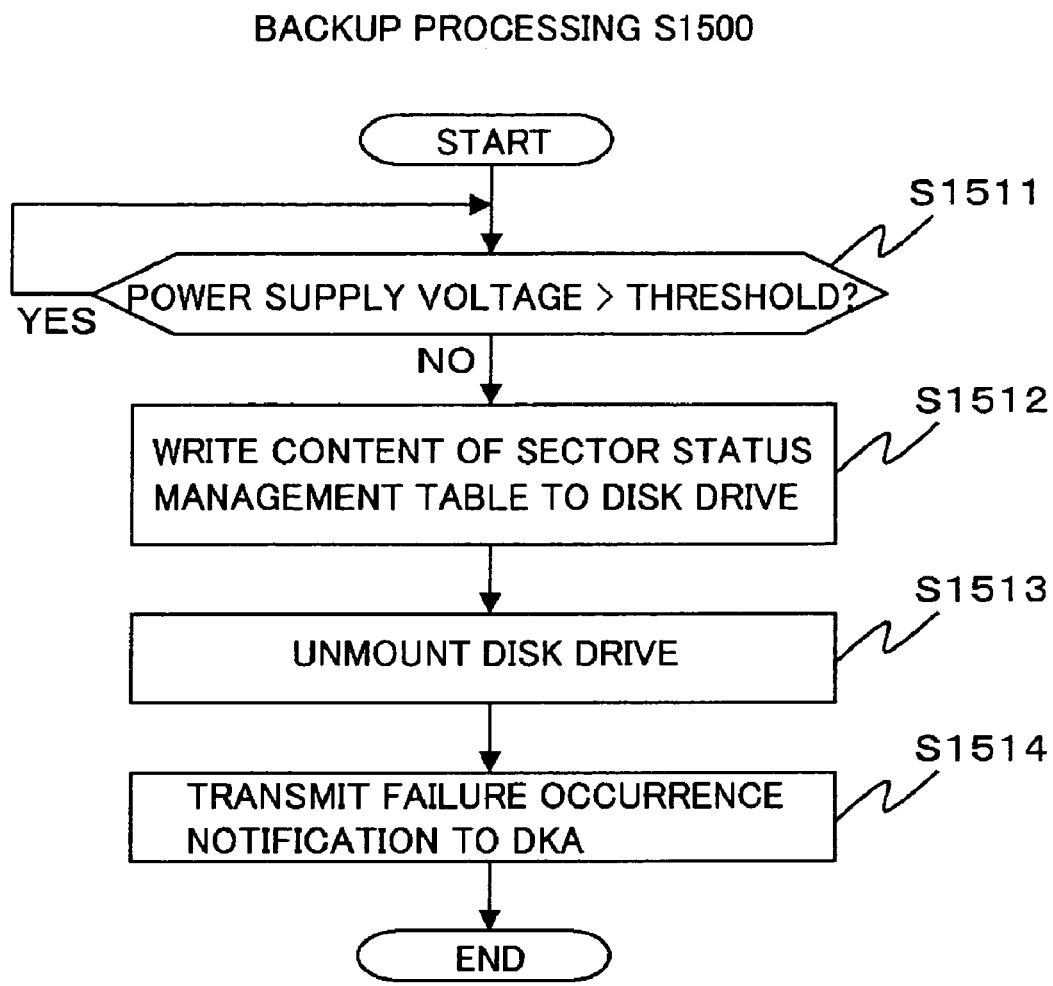
FIG. 15 is a flowchart explaining backup processing S1500.

When a failure of some kind occurs in the conversion board 215, resulting in a loss of the sector status management table 900 stored in the memory 2156 of the conversion board 215, there arise obstacles to the execution of the Write processing S1000, Null processing S1300 and Read processing S1400. Therefore, the conversion board 215 automatically backs up the sector status management table 900 to the disk drive 210 when detecting occurrence of failure. In the following, explanation will be given on this processing (hereinafter referred to as backup processing S1500) with reference to the flowchart illustrated in FIG. 15.

The backup processing part 715 of the conversion board 215 monitors in real time whether or not power supply voltage (drive voltage) of the conversion board 215 exceeds a predetermined threshold value based on a signal inputted from the power supply voltage monitoring circuit 2157 (S1511).

When detecting that the power supply voltage is reduced to the threshold value or lower (S1511: NO), the backup processing part 715 writes (destages) the content of the sector status management table 900 to the disk drive 210 (S 1512).

Then, when completing storage (backup) of the sector status management table 900 to the disk drive 210, the backup processing part 715 stops (unmounts) the disk drive 210 (S 1513). The reason why the disk drive 210 is stopped in this way is that when access to the disk drive 210 is performed during occurrence of the failure in the conversion board 215, there is a high possibility that the range of failure expands to cause damage to the data stored in the disk drive 210.

In S1514, the backup processing part 715 notifies the DKA 120 of occurrence of the failure in the DKA 120.

Note that when failure of the conversion board 215 is recovered or the conversion board 215 is replaced with a normal conversion board 215, the backup processing part 715 of the conversion board 215 reads the sector status management table 900 backed up to the disk drive 210 and stores the sector status management table 900 in the memory 2156.

As mentioned above, when a failure of some kind occurs in the conversion board 215, it is possible to safely back up the sector status management table 900. Moreover, when the failure is recovered, it is possible to write the sector status management table 900 corresponding to the current status of the disk drive 210 to the conversion board 215, and to smoothly resume the operation of the disk drive 210.

It should be noted that the above embodiment has been explained to facilitate under-standing of the present invention and is not intended to limit the present invention. The present invention can be changed and modified without departing from the scope of the invention and it is a matter of course that the invention includes equivalents thereof.

The invention claimed is:

1. A storage apparatus for performing writing or reading data to and from a storage device in response to a data input/output request transmitted from an external apparatus, the storage apparatus comprising:
a memory for storing programs; and
a processor for reading and executing a program stored in the memory, and wherein the CPU is configured to:
generate, upon receiving a data write request to the storage device as the data input/output request, a first error detecting code of write data to be written to the storage device by the data write request;
store the first error detecting code in the memory; execute write processing of the write data to the storage device;
determine whether or not a response time as time required for the write processing exceeds a predetermined threshold value;

read data from a unit storage area of the storage device as a writing destination of the write data when the response time exceeds the threshold value, the read data being stored in the storage area;

generate a second error detecting code of the read data; and generate a signal indicating that the write processing was not normally performed, when the first error detecting code and the second error detecting code do not coincide with each other as a result of comparison of the two codes.

2. The storage apparatus according to claim 1, wherein the CPU is further configured to:

store a unit storage area status management table that manages whether or not effective data is currently written in each unit storage area of the storage device;

determine whether or not effective data is currently written in the unit storage area as the writing destination of the write data with reference to the unit storage area status management table prior to execution of the write processing; and generate a signal indicating that the write processing was not normally performed, when the effective data is currently written in the unit storage area.

3. The storage apparatus according to claim 2, wherein the CPU is further configured to update contents of the unit storage area status management table to contents which indicates that effective data is currently written in the unit storage area of the storage device as the writing destination of the write data, when the first error detecting code and the second error detecting code coincide with each other as a result of a comparison of the two codes.

4. The storage apparatus according to claim 3, further comprising:

a control device including a channel controlling device, a disk controlling device and a cache memory that are coupled to one another; and the storage device including a disk drive, wherein the channel controlling device transmits an input/output command to the disk controlling device when receiving the data input/output request from the external apparatus, wherein the disk controlling device writes or reads data to or from the disk drive when receiving the input/output command, wherein the channel controlling device and the disk controlling device gain access to the cache memory to transmit and receive write data to the disk drive or read data from the disk drive, and wherein any one of the control device and the storage device includes a CPU, a memory, and a conversion board which is disposed between the disk controlling device and the disk drive and which performs conversion between a data frame structure transmitted and received to and from the disk controlling device, and a data frame structure transmitted and received to and from the disk drive.

5. The storage apparatus according to claim 4, wherein the unit storage area of the storage device is a sector of the disk drive, and wherein the conversion performed by the conversion board between the data frame structure transmitted and received to and from the disk controlling device, and the data frame structure transmitted and received to and from the disk drive, is conversion between a sector size of the data frame transmitted and received to and from the disk controlling device, and a sector size of the data frame transmitted and received to and from the disk drive.

6. The storage apparatus according to claim 5, wherein the sector size of the data frame transmitted and received to and from the disk controlling device is a sector size of a SAS type disk drive, and wherein the sector size of the data frame transmitted and received to and from the disk drive is a sector size of a SATA type disk drive.

7. The storage apparatus according to claim 4, wherein the conversion board stores the unit storage area status management table, and wherein, in the conversion board, a backup processing part that writes contents of the unit storage area status management table to the disk drive when a power supply voltage of the conversion board is a predetermined threshold value or lower is implemented by the CPU of the conversion board executing a program stored in the memory.

8. The storage apparatus according to claim 1, wherein the CPU is further configured to:

store a unit storage area status management table that manages whether or not effective data is currently written in each unit storage area of the storage device;

determine whether or not effective data is currently written in the unit storage area as a target of initialization processing with reference to the unit storage area status management table prior to execution of initialization processing of the unit storage area of the storage device; and generate a signal indicating that the initialization processing is not normally performed, when effective data is currently written in the unit storage area.

9. The storage apparatus according to claim 8, wherein the CPU is further configured to:

execute initialization processing of the unit storage area when effective data is not currently written in the unit storage area as a result of the determination, and update contents of the unit storage area status management table to contents indicating that effective data is not currently written in the unit storage area of the storage device as a target of the initialization processing.

10. The storage apparatus according to claim 1, wherein the CPU is further configured to:

store a unit storage area status management table that manages whether or not effective data is currently written in each unit storage area of the storage device;

determine whether or not effective data is currently written in the unit storage area as a storage destination of the read data with reference to the unit storage area status management table prior to executing data read processing from the unit storage area of the storage device; and generate a signal which indicates that the read processing was not normally performed, when effective data is not currently written in the unit storage area.

11. The storage apparatus according to claim 10, wherein the CPU is further configured to execute read processing of the data from the unit storage area when effective data is currently written in the unit storage area as a result of the determination.

12. The storage apparatus according to claim 1, wherein the CPU is further configured to execute, upon receiving a data initialization request to the storage device as a Null value write request, initialization processing for the storage device without generating a error detecting code of Null value to be written to the storage device by the Null write request.

13. A data verification method in a storage apparatus that has a CPU and a memory and performs writing or reading data to or from a storage device in response to a data input/output request transmitted from an external apparatus, comprising the steps of:

generating a first error detecting code of write data to be written to the storage device by a data write request when receiving the data write request to the storage device as the data input/output request;

storing the first error detecting code in the memory;

executing write processing of the write data to the storage device;

determining whether or not response time as time required for the write processing exceeds a predetermined threshold value;

reading data, from a unit storage area of the storage device as a unit storage area of the write data when the response time exceeds the threshold value, the read data being stored in the unit storage area;

generating a second error detecting code of the read data; and comparing the first error detecting code and the second error detecting code, and generating a signal indicating that the write processing was not normally performed when the first error detecting code and the second error detecting code do not coincide with each other, wherein the steps are performed by the storage apparatus.

14. The data verification method in the storage apparatus according to claim 13, further comprising the steps of:

storing a unit storage area status management table that manages whether or not effective data is currently written in each unit storage area of the storage device;

determining whether or not effective data is currently written in the unit storage area as a writing destination of the write data with reference to the unit storage area status management table prior to execution of the write processing; and generating a signal which indicates that the write processing was not normally performed, when the effective data is currently written in the unit storage area, wherein the steps are performed by the storage apparatus.

15. The data verification method in the storage apparatus according to claim 14, further comprising the step of:

updating contents of the unit storage area status management table to contents which indicate that effective data is currently written in the unit storage area of the storage device as the writing destination of the write data, when the first error detecting code and the second error detecting code coincide with each other as a result of comparing the two codes, wherein the step is performed by the storage apparatus.

16. The data verification method in the storage apparatus according to claim 13, wherein the storage apparatus further comprises a control device including a channel controlling device, a disk controlling device, a cache memory that are coupled to one another; and the storage device including a disk drive, wherein the channel controlling device transmits an input/output command to the disk controlling device when receiving the data input/output request from the external apparatus, wherein the disk controlling device writes or reads data to or from the disk drive when receiving the input/output command, wherein the channel controlling device and the disk controlling device gain access to the cache memory to transmit and receive write data to the disk drive or read data from the disk drive, and wherein any one of the control device and the storage device includes a CPU, a memory, and a conversion board which is disposed between the disk controlling device and the disk drive and which performs conversion between a data frame structure transmitted and received to and from the disk controlling device, and a data frame structure transmitted and received to and from the disk drive.

* * * * *